Sept. 27, 1960 W. J. RACE 2,953,927

CONTROLS FOR RADIO RECEIVER

Filed Aug. 25, 1958 2 Sheets-Sheet 1

Inventor:
William J. Race
By: Mueller & Aichele
Attys.

Sept. 27, 1960 W. J. RACE 2,953,927

CONTROLS FOR RADIO RECEIVER

Filed Aug. 25, 1958 2 Sheets-Sheet 2

Inventor:
William J. Race
By: Mueller & Aichele
Att'ys.

United States Patent Office 2,953,927

Patented Sept. 27, 1960

2,953,927

CONTROLS FOR RADIO RECEIVER

William J. Race, Franklin Park, Ill., assignor to Motorola, Inc., Chicago, Ill., a corporation of Illinois Filed Aug. 25, 1958, Ser. No. 756,931

3 Claims. (Cl. 74—10.27)

This invention relates to control apparatus and more particularly to radio control apparatus which is adapted to be mounted in a variety of different supporting structures such as the dashboards of automobiles, trucks, airplanes or the like.

Most auto radios are positioned behind the dashboard of a car with a pair of shafts for manual volume and tuning adjustment extending through apertures formed in the dashboard. Since many automobiles are sold with radio receivers already installed, substantially all cars manufactured are provided with a set of apertures in the dashboard for a radio receiver. However, the relative positions of these apertures vary somewhat between different makes and models of automobiles. For this reason, one who buys an auto without a radio and desires to have a receiver installed subsequently must purchase a model in which the relative positions of the control shafts thereof corresponds to the apertures provided in the dashboard of his car. Manufacturers of auto radios must make different models to fit the various dashboard configurations, and the provision of a substantial number of different models necessarily adds to overall manufacturing costs.

In the past, receivers have been provided in which the position of the volume control shaft is adjustable. This can be accomplished easily since the volume control potentiometer is connected to the remainder of the receiver only electrically. However, substantial mechanical problems must be overcome to provide a control shaft that is capable of operating the mechanical tuning control means from a number of different positions since the position of the body of the tuner must remain fixed.

It is an object of the present invention, therefore, to provide a radio receiver that can easily be installed in a variety of different makes of automobiles or similar vehicles.

It is a further object of the invention to provide a manual tuning mechanism for a radio receiver having a manually actuated tuning shaft which may be mounted in a variety of different positions with respect to the main body of the tuner.

It is another object of the invention to provide a tuning mechanism for an auto radio receiver which is adjustable for mounting with a variety of spacings between volume and tuning control knobs and which provides reliable control in all mounted positions.

A feature of the present invention is the provision of an automobile radio receiver having a flexible shaft or cable carrying a pinion gear effective to adjust a tuning member and coupled to a rotatable control member whose lateral position may be shifted while the pinion stays in a fixed lateral position relative to the member that it drives.

A further feature of the invention is the provision of such a receiver having a tension spring cooperating with the aforesaid pinion to hold it against an actuated crown gear while the member controlling rotation of the pinion is shifted in position.

Still another feature of the invention is the provision of a U-shaped bracket having a pair of slotted arms within which a flexible shaft and a pinion mounted on one end thereof are adapted to slide with the bracket holding the shaft and pinion in a predetermined horizontal plane thereby to prevent binding and to ensure reliable operation of the tuning apparatus.

In accordance with the present invention a radio receiver is provided having adjustably mounted tuning and volume controls. The tuning control includes a first gear carried on an adjustable treadle which is used to control tuning members and a second gear or pinion operatively connected to the first gear and adapted to rotate it. The pinion is coupled to a rotatable manual control shaft by means of a flexible shaft or cable. The manual control shaft is constructed to be mounted in a variety of different lateral positions with respect to the crown gear while still being operatively connected to rotate it. A tension spring is provided to urge the pinion against the crown gear. The flexible shaft carrying the pinion rides in the slotted arms of a U-shaped bracket so that it is maintained in a predetermined horizontal plane and does not tend to bind whatever the position of the manual control shaft. The volume control includes a shaft also adapted for adjustable mounting at a variety of positions along the front plate of the tuner. In this way, the relative positions of the volume and tuning control knobs can be adjusted so that the shafts will fit through the apertures provided in a variety of supporting structures such as the dashboards of different makes of automobiles.

Figure 1:
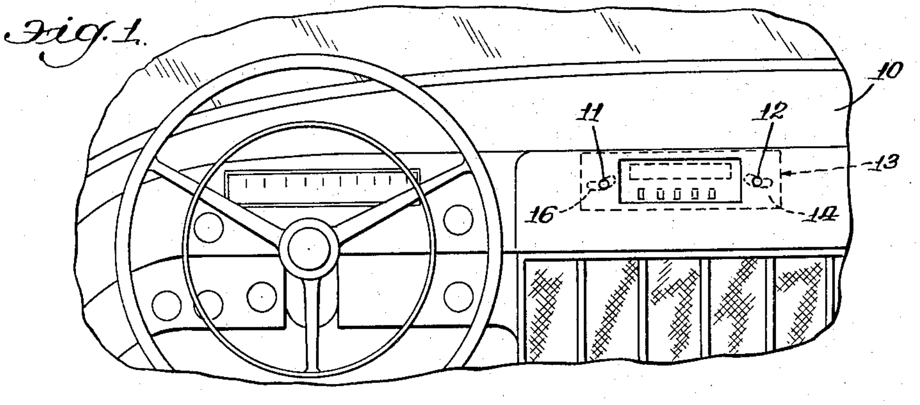
Fig. 1 is a perspective view illustrating the mounting of a radio receiver behind the dashboard of a typical automobile.

Fig. 1 shows a typical automobile having a dashboard 10 with spaced apart openings 11 and 12 formed therein to accommodate manual control shafts for a radio receiver control mechanism generally indicated in phantom at 13. The front plate 14 of the receiver is provided with a pair of generally kidney-shaped apertures 16 and 17 which are illustrated in more detail in Fig. 8 and which are larger than openings 11 and 12. The spacing between dashboard openings 11 and 12 will vary sufficiently among the different makes of cars so that no one receiver will have its control shafts positioned to fit all makes but the variation is not so great that the various varieties will not fit within the elongated openings 16 and 17. It will be understood, of course, that the particular shapes of these openings are merely illustrative and that their size and shape will depend upon the range of shaft spacings it is necessary to accommodate.

Figure 2:
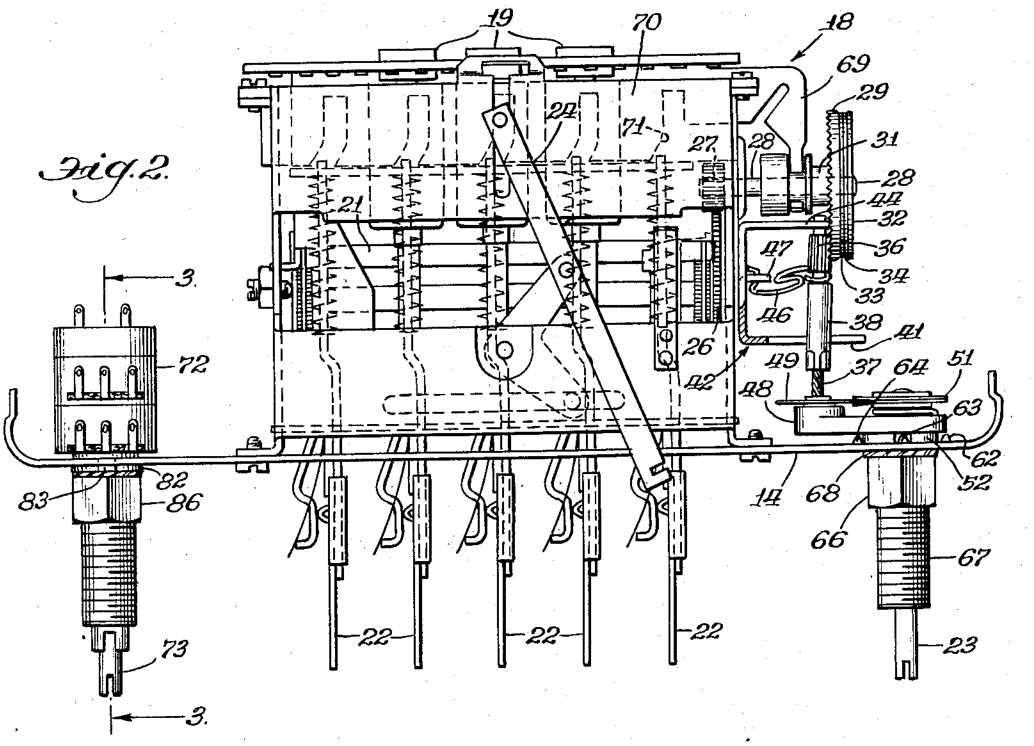
Fig. 2 is a plan view of control apparatus in accordance with the present invention.

The receiver control mechanism generally indicated at 18 in Fig. 2 includes the usual adjustable tuning cores 19 operatively connected to the treadle 21. In the particular embodiment illustrated, the treadle may be operated by the pushbuttons 22 or may be manually controlled through the rotatable shaft 23. Although apparatus including pushbutton control means is illustrated, it will be understood that the present invention has equal application to devices in which manual tuning means alone are provided.

The pushbutton tuning means of the device is known and the structure of the pushbuttons 22 or their cooperation with the treadle 21 will not be described in detail. The tuning device is provided with the usual indicator arm 24 which is actuated by changes in position of the tuning coil 19.

Manual tuning of the device is accomplished through the cooperating gears 26 and 27 the latter of which is carried on one end of shaft 28 with the crown gear 29 being mounted adjacent the other end. Gear 29 is connected to the collar 31 which is axially slidable along the shaft 28. Plate 32 is fixedly mounted on the shaft 28 and clutch plates 33 and 34 cooperate to frictionally hold crown gear 29 against the plate 32.

Crown gear 29 is turned by the action of the toothed pinion 36 which is mounted on the flexible cable 37. The collar 38 is also carried on the cable 37 and fits slidably within the slot 39 formed in the bifurcated arm 41 of the bracket 42 which is more clearly illustrated in Fig. 9. The free end of the cable 37 rides in the slot 43 of the other bifurcated arm 44 of the bracket. S-shaped tension spring 46 has its one end passing through the lug 47 of the bracket 42 and its other end coiled around the cable 37 between pinion 36 and collar 38. The action of spring 46 tends to hold pinion 36 operatively against crown gear 29.

One end of the cable 37 is fixed to the circular plate 49 and is rotatable therewith. Plate 49 is rotatably mounted on mounting plate 48. The edge of the plate 49 is held by the pinch washer 51 which is rotatably mounted on the control shaft 23 which passes through the opening 17 of the front plate 14 as more clearly illustrated in Fig. 8.

Figures 4, 7, 8, 9:
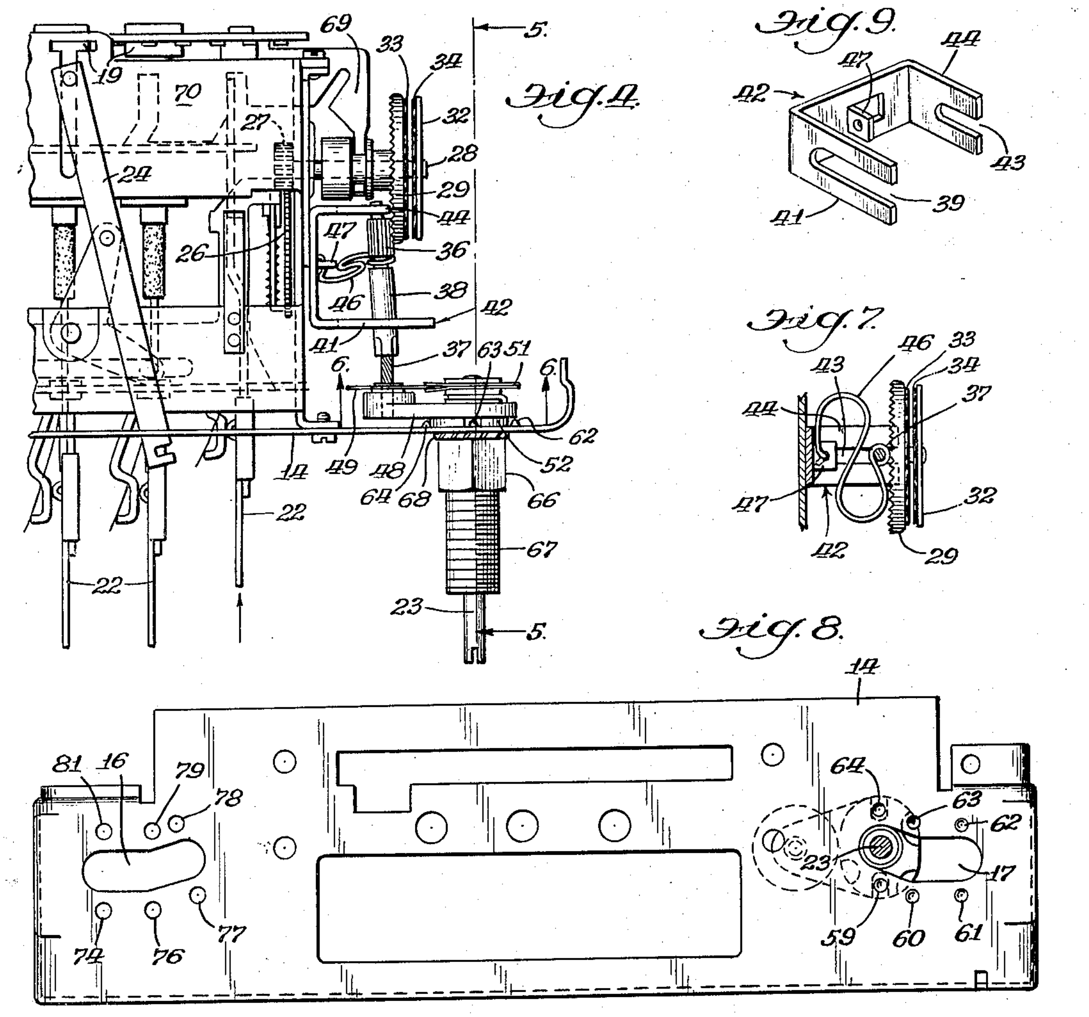
Fig. 4 is a plan view of the tuning apparatus shown in Fig. 2 illustrating movement of various parts thereof during the activation of pushbutton control means.
Fig. 7 is a view taken in section on the line 7—7 of Fig. 5.
Fig. 8 is a plan view showing the front panel of the receiver of the present invention.
Fig. 9 is a perspective view of a bracket used in positioning the movable pinion member forming part of the present tuning mechanism.
Figure 6:
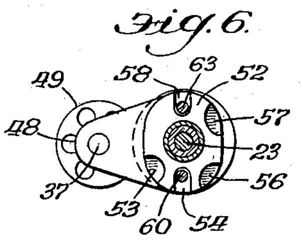
Fig. 6 is a view taken in section taken on the line 6—6 of Fig. 4.

The mounting plate 48 includes the portion 52 which has a plurality of cored-out pockets 53, 54, 56, 57 and 58 as more particularly shown in Figs. 6 and 8. The inner surface of front plate 14 has a plurality of dimples or bosses formed therein and indicated by reference characters 58, 59, 61, 62, 63, and 64. The dimples are adapted to fit within the pockets and provide positive positioning of the mounting plate 48 with respect to the front plate 14 with the control shaft 23 passing through openings 17 and with the nut 66 carried on the threaded sleeve 67 pressing the washer 68 against the front plate.

In tuning devices having both pushbutton and manual controls it is usually necessary to provide means for disengaging the manual controls when the pushbuttons are operated so as to avoid back-driving of the manual controls. In the tuner illustrated, this is accomplished by means of the slide plate 70 which has an arm portion 69 connected to the slidable collar 31 and adapted to move it axially along the shaft 28 when one of the pushbutton arms 22 is moved against one of the camming surfaces 71 provided on the slide plate. This action is illustrated in Fig. 4 wherein one of the pushbuttons 22 is shown in its actuated position thus sliding the plate 70 toward the left and pulling crown gear 29 away from the fixed plate 32. Thus, the turning of the treadle 21 by the action of the depressed pushbutton causes the shaft 28 to rotate inside the crown gear 29 which remains fixed so that back-driving does not take place. It is to be noted that the movement of the crown gear 29 along the shaft 28 carries the pinion 36 along with it as particularly shown in Fig. 4. This is because the flexible cable 37 is capable of pivoting about its fixed end and sliding within slots 39 and 43.

Figure 3:
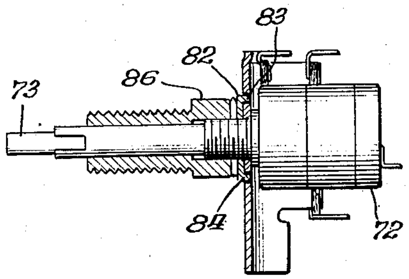
Fig. 3 is a view in section taken on the line 3—3 of Fig. 2.
Figure 5:
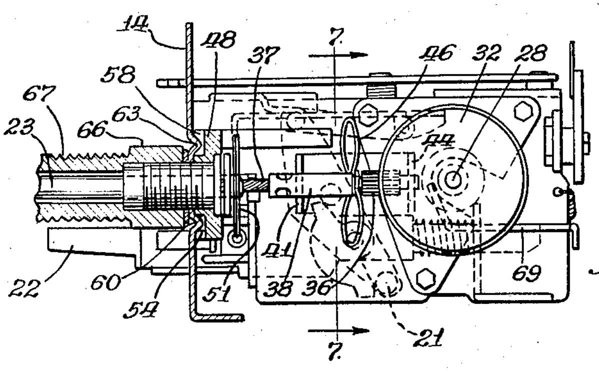
Fig. 5 is a view taken in section on the line 5—5 of Fig. 4.

Volume control of the radio receiver is accomplished by means of the potentiometer 72 shown in Figs. 2 and 3. The potentiometer is adjusted by means of the control shaft 73 which passes through the opening 16 in the front plate 14. The potentiometer itself is relatively small and can be mounted at different positions with respect to the tuning apparatus. As shown in Fig. 8, the front plate 14 is provided with small apertures 74, 76, 77, 78, 79 and 81 adjacent the opening 16. A washer 82 is provided with a pair of inturned ears 83 and 84 (Fig. 5) which are adapted to fit into a pair of these holes such as 81 and 74 and positively position the potentiometer 72 and control shaft 73 when the nut 86 is tightened. As shown in Fig. 8 the potentiometer 72 and its control shaft 73 can thus be positioned in any of three alternate positions depending upon which set of apertures the turned in ears 83 and 84 fit. It will be understood, of course, that although three sets of holes are illustrated a greater number may be provided to permit a greater number of positions. The holes and the lugs may be eliminated altogether and the potentiometer 72 held in place simply by tightening of the nut 86 against the front plate 14 so that an infinite number of intermediate positions are available.

Although the positioning of the volume control shaft 73 presents a relatively simple problem, the adjustable positioning of the tuning control shaft 23 is much more difficult since it is necessary to have it operatively connected to the crown gear 29 with the tuning shaft located in any of a number of alternate positions. In accordance with the present invention, this is accomplished by the mounting of pinion 36 on the flexible cable 37 and providing the tension spring 46 to maintain the pinion in operative contact with the crown gear 29. The bracket 42 holds the cable 37 and the pinion 36 in a predetermined horizontal plane thus preventing binding and insuring reliable operation for any position of the control shaft 23 whether it be shifted horizontally or vertically.

While installing the receiver in an automobile, the control shaft 23 is aligned with and passed through the dashboard opening 12 illustrated in Fig. 1 with the position of the mounting plate 48 being adjusted to provide such alignment. The mounting plate 48 is movable to the position desired with the cable 37 pivoting about its fixed end while pinion 36 maintains operative contact with crown gear 29 under the urging of spring 46. Positive positioning of the mounting plate 48 is accomplished by aligning a pair of the cored-out pockets such as 54 and 58 with projecting bosses 59 and 64, respectively, as shown in Figs. 6 and 8. In the position illustrated in Fig. 8, the mounting plate 48 is at one end of the kidney-shaped opening 13. It will be evident that it may be moved to either of two alternate positions downwardly and to the right by aligning different ones of the pockets with other of the protruding bosses such as 60 and 63.

It should be noted that the provision of the pockets and bosses simply provides a more positive positioning of the mounting plate 48 and that the particular arrangement shown is merely illustrative of one embodiment of the invention. Thus, a different number of bosses may be provided to allow positive positioning in a larger number of finite positions than three or the boss and pocket combination may be eliminated and the control shaft 23 mounted in an infinite number of positions within the confines of the opening 17 simply by the holding action of the nut 66 and the washer 68 against the front plate. Likewise, the particular shape of the openings 17 is merely illustrative and openings of other shapes may be provided where necessary or desirable for a different range of positionings.

At whatever point the tuning control shaft 23 is positioned, it would still be operatively connected to the treadle because the flexible cable 37 can move to different angular positions as, for example, those illustrated in Figs. 2 and 4. The action of the tension spring 46 maintains the pinion 36 in operative contact with the crown gear while the bracket 42 effectively prevents binding between the rotatable cable and the crown gear in whatsoever position the mounting plate 48 is placed so long as the cable 37 is held by the bracket arms.

The present invention thus provides an effective yet relatively inexpensive tuning apparatus wherein the lateral spacing between volume and tuning control shafts can be adjusted to fit any combination of dashboard openings such as are provided by different makes of automobiles. This permits the manufacture of a single auto radio model suitable for installation in any standard automobile.

Although the invention has been particularly described with respect to its application to auto radio receivers, it will be understood that it may be used to provide tuning controls for radios used in other vehicles such as trucks, boats and airplanes or for the mounting of a receiver on any supporting structure wherein different spacings for control shaft apertures are provided in various individual structures.

I claim:

1. In a radio receiver for mounting behind the dashboard of an automobile and wherein the lateral spacing between a pair of control shafts of said receiver is adjustable to correspond to available openings in the automobile dashboard, control apparatus coupling mechanism including in combination, a crown gear operatively connected to adjustable tuning means, a rotatable control shaft extending from within the radio receiver at a right angle to the axis of said crown gear, means for mounting said control shaft on the radio receiver in a plurality of coupled positions with respect to said crown gear, a flexible cable rotatably fixed at one end to said means for mounting said control shaft and being rotatably controlled by said control shaft, rigid collar means encasing said flexible cable over a portion of its length, slotted bracket means slidably engaging said collar means for retaining said flexible cable within a predetermined plane and allowing rotational, axial and lateral movement thereof to accommodate the plurality of coupled positions of said control shaft and said crown gear, an elongated pinion gear connected to said flexible cable to operatively drive said crown gear within the range of relative positions in which said crown gear and said control shaft are coupled, and spring means operatively connected to said pinion gear and urging the same into continuous engagement with said crown gear.

2. In a radio receiver having a control member selectively mounted in one of a plurality of positions to correspond to an opening in a supporting structure for the receiver, control apparatus including in combination, tuning means including a crown gear for driving the same, a mounting plate adapted to be supported at different positions in the receiver, a rotatable control shaft supported by said plate and being mountable thereby in a plurality of positions, elongated coupling means supported by said plate and coupled to said control shaft for rotation thereby, said coupling means having a portion at the end thereof supported by said plate permitting variation in the angular position of said coupling means with respect to said plate, an elongated pinion gear connected to said coupling means at the end thereof remote from said plate and positioned in operative engagement with said crown gear to drive the same, with the engagement of said pinion gear and said crown gear changing as said plate is supported in different positions in the receiver, bracket means engaging said coupling means for retaining the same in a plane which includes the axis of said crown gear, and resilient means engaging said coupling means and urging said pinion gear into continuous engagement with said crown gear.

3. An automobile radio receiver for installation on the dashboard of an automobile having a pair of apertures therein which may be spaced by various amounts, said receiver including in combination, a front plate having first and second elongated apertures therein, volume control means having a shaft passing through said first aperture in said front plate, mounting means for adjustably positioning said volume control means on said front plate with said shaft within said first aperture in said front plate, a tuning control shaft passing through said second aperture in said front plate, a plurality of bosses formed in said front plate adjacent said second aperture, a mounting plate connected to the inner end of said tuning control shaft and having a plurality of cored-out pockets adapted to accommodate different ones of said bosses to positively position said tuning control shaft at different positions within said second aperture of said front plate, a flexible cable supported by said mounting plate and rotatably controlled by said tuning control shaft, an elongated pinion carried on said cable, a tuner device having a crown gear for controlling the same, an S-shaped spring connected to said cable and adapted to urge said elongated pinion into operative engagement with said crown gear, whereby said pinion remains in continuous operative engagement with said crown gear over the range of positions of said cable when said tuning control shaft is located at different positions within said second aperture in said front plate, said volume control shaft and said tuning control shaft being so positioned on said front plate to fit in the apertures in the dashboard of an automobile.

References Cited in the file of this patent

UNITED STATES PATENTS

| | | |
|---|---|---|
| 2,346,399 | Schwarz et al. | Apr. 11, 1944 |
| 2,461,114 | Goldberg | Feb. 8, 1949 |
| 2,875,620 | Hiselwood | Mar. 3, 1949 |
| 2,770,137 | Sacre | Nov. 13, 1956 |
| 2,799,170 | Davis | July 16, 1957 |